United States Patent
Mepham et al.

(10) Patent No.: US 7,155,329 B2
(45) Date of Patent: Dec. 26, 2006

(54) VEHICLE DECELERATION DISPLAY SYSTEM AND CALCULATION METHOD

(75) Inventors: Dan W. Mepham, Belmont (CA); Norman Joseph Weigert, Whitby (CA)

(73) Assignee: General Motors of Canada, Oshawa (CA)

(*) Notice: Subject to any disclaimer, the term of this patent is extended or adjusted under 35 U.S.C. 154(b) by 263 days.

(21) Appl. No.: 10/852,446

(22) Filed: May 24, 2004

(65) Prior Publication Data

US 2005/0261819 A1    Nov. 24, 2005

(51) Int. Cl.
G06F 17/00    (2006.01)
B60T 8/32    (2006.01)

(52) U.S. Cl. .................. 701/70; 701/79; 303/121; 303/138

(58) Field of Classification Search ............ 701/70, 701/78–79; 303/121, 138, 160; 340/425.5, 340/438
See application file for complete search history.

(56) References Cited

U.S. PATENT DOCUMENTS

| 5,463,370 | A | 10/1995 | Ishikawa et al. ........... 340/439 |
| 5,594,415 | A | 1/1997 | Ishikawa et al. ........... 340/467 |
| 5,736,926 | A | 4/1998 | Winholtz ................... 340/479 |
| 5,838,259 | A | 11/1998 | Tonkin ...................... 340/903 |
| 5,856,793 | A | 1/1999 | Tonkin et al. ............. 340/903 |
| 6,020,814 | A | 2/2000 | Robert ...................... 340/467 |
| 6,133,852 | A | 10/2000 | Tonkin ...................... 340/903 |
| 6,249,219 | B1 | 6/2001 | Perez et al. ................ 340/467 |
| 6,268,792 | B1 | 7/2001 | Newton ..................... 340/467 |
| 6,278,364 | B1 | 8/2001 | Robert ...................... 340/467 |
| 6,411,204 | B1 | 6/2002 | Bloomfield et al. ........ 340/467 |
| 6,424,256 | B1 | 7/2002 | Ryder ....................... 340/479 |
| 6,445,289 | B1 | 9/2002 | Roberts ..................... 340/467 |
| 6,459,980 | B1 * | 10/2002 | Tabata et al. ............... 701/70 |
| 6,525,652 | B1 | 2/2003 | Smith ..................... 340/425.5 |
| 6,573,830 | B1 | 6/2003 | Cohen et al. ............. 340/479 |
| 6,870,474 | B1 * | 3/2005 | Brothers .................... 340/468 |

* cited by examiner

Primary Examiner—Y. Beaulieu
(74) Attorney, Agent, or Firm—Laura C. Hargitt

(57) ABSTRACT

A vehicle deceleration display system includes a serial data bus operable for communicating a plurality of sequentially-measured vehicle speed datums in a respective sequential manner. A control unit is operatively connected to the serial data bus and is operable for receiving and processing the vehicle speed data therefrom. The control unit is programmed to sequentially calculate vehicle deceleration values respectively corresponding with the sequential speed data to provide a variable output signal. The variable output signal corresponds with and varies in accordance with the sequential vehicle deceleration values. A variable display is connected to the control unit and varies in response to the deceleration values. A method of calculating and displaying vehicle deceleration values is also provided.

20 Claims, 2 Drawing Sheets

VEHICLE DECELERATION DISPLAY SYSTEM AND CALCULATION METHOD

TECHNICAL FIELD

This invention relates to vehicle deceleration display systems and calculation methods.

BACKGROUND OF THE INVENTION

Vehicles typically employ conventional on/off brake lights that are triggered by application of a brake pedal to indicate that the vehicle's brakes are applied. Some vehicles are equipped with sequentially illuminating lamps visible to a trailing driver. The sequentially illuminating lamps may be illuminated upon decreasing vehicle velocity that is measured from a wheel speed sensor. Others of such systems may base deceleration on vehicle speed determined from a sensor attached to a brake pedal. Still other vehicles equipped with sequentially illuminating lamps may base vehicle deceleration upon measurements from a decelerometer.

SUMMARY OF THE INVENTION

The present invention includes a vehicle deceleration display system for a leading vehicle that provides an indication to trailing drivers of vehicle deceleration and optionally, implementation of an antilock brake system, a traction control system, occurrence of an under steer event or a rollover event. A variable display on the leading vehicle is varied based upon information provided from the vehicle's serial data bus. The information is received and processed by a control unit on the vehicle.

A vehicle deceleration display system includes a serial data bus operable for communicating a plurality of sequentially measured vehicle speed datums in a respective sequential manner. A control unit is operatively connected to the serial data bus and operable for receiving and processing the vehicle speed data therefrom. The control unit is programmed to sequentially calculate vehicle deceleration values respectively corresponding with the sequential vehicle speed data to provide a variable output signal. The variable output signal corresponds with and varies in accordance with the sequential vehicle deceleration values. The variable display is operatively connected to the control unit. The variable display varies in response to the output signal.

In one aspect of the invention, each datum is a measurement of the speed of an output shaft of a transmission on the vehicle. The control unit is further programmed for controlling the transmission using the sequential vehicle speed data. As many modern vehicles already include a serial data bus that relays transmission output shaft speed to a control unit, the invention permits existing components (i.e., the serial data bus and the control unit) to be utilized, thus maximizing cost efficiency.

In another aspect of the invention, each of the vehicle deceleration values ($Dec_{INST}$) is defined by the equation $Dec_{INST} = (V_C - V_P)/T$. $V_C$ and $V_P$ are consecutively-received vehicle speed data. $V_C$ is received subsequently to $V_P$. T is the elapsed time between reception of the respective data.

In another aspect of the invention, each of the vehicle's deceleration values represents an average of a number of sequentially calculated deceleration values:

$$Dec_{AVG} = \sum_{n=1}^{N} ((V_{n+1} - V_n)/(T_{n+1} - T_n))/N$$

$V_n$ and $V_{n+1}$ are consecutively-received vehicle speed data. $V_{n+1}$ is received subsequently to $V_n$. $T_{n+1}$ is the time of reception of $V_{n+1}$. $T_n$ is the time of reception of $V_n$. N is the number of sequential speed data over which the vehicle deceleration value $Dec_{AVG}$ is calculated.

In yet another aspect of the invention, the control unit is programmed to calculate the difference between a first calculated vehicle deceleration value and a second calculated vehicle deceleration value. The second deceleration value is calculated based on later sequential speed data than the first deceleration value is based upon. The control unit provides the output signal varying in correspondence with the second deceleration value after a first amount of time $T_1$ when the second deceleration value is greater than the first deceleration value by a first amount. The control unit provides the output signal varying in correspondence with the second deceleration value after a second amount of time $K_2$ when the second deceleration value is less than the first deceleration by a second amount. $K_1$ is different than $K_2$. Accordingly, the output signal varies to correspond with the second deceleration value at a different rate when vehicle deceleration is increasing than when vehicle deceleration is decreasing.

In another aspect of the invention, the control unit is further programmed to compare the vehicle deceleration value with the minimum threshold value. The control unit does not provide the output signal when the vehicle deceleration value is less than the minimum threshold value. Accordingly, the variable display does not vary in response to deceleration values less than the minimum threshold value.

In yet another aspect of the invention, the serial data bus is further operable for communicating to the control unit vehicle stability data. Vehicle stability data includes at least one of implementation of an anti-lock brake system, implementation of a traction control system, occurrence of an under steer event, and occurrence of a rollover event. The control unit provides the output signal at a preset level when the vehicle stability data is communicated. Different preset levels may be provided for each of the above-listed stability data.

In yet another aspect of the invention, the variable display comprises a plurality of light-emitting diodes (LEDs) arranged in an array (preferably a horizontal array) and mounted on the rear of the vehicle. The LEDs are illuminated in sequential pairs outward from a center of the array. The number of sequential pairs illuminated is in increasing non-linear proportion to the magnitude of the output signal. "Increasing nonlinear proportion" means that the number of sequential pairs illuminated increases at a rate greater than linearly as the magnitude of the output signal increases.

In yet another aspect of the invention, at least some of the LEDs are illuminated in response to application of a vehicle brake pedal. The LEDs illuminated in response to application of the brake pedal are centrally-located in the array.

A method includes calculating vehicle deceleration values from sequentially-measured vehicle speed data received via a serial data bus. The method further includes providing an output signal that varies in accordance with the calculated vehicle deceleration values.

In one aspect of the invention, the method further includes varying a variable display in response to the output signal.

In yet another aspect of the invention, the variable display comprises a plurality of light emitting diodes (LEDs) arranged in an array and mounted on the rear of the vehicle. Varying the variable display includes illuminating the LEDs in sequential pairs outward from a center of the array. The number of sequential pairs illuminated is in increasing nonlinear proportion to the magnitude of the output signal.

In yet another aspect of the invention, the vehicle speed data comprises a plurality of sequentially-measured speeds of an output shaft of a transmission. The method includes controlling the transmission via the control unit using the sequential vehicle speed data.

In another aspect of the invention, the output signal varies increasingly nonlinearly with increasing vehicle deceleration values.

In yet another aspect of the invention, calculating includes subtracting a received vehicle speed datum ($V_p$) from a consecutive, subsequently-received vehicle speed datum ($V_c$) and dividing the result ($V_c-V_p$) by the elapsed time between receipt of the respective data.

In another aspect of the invention, the method includes averaging a number of sequentially-calculated vehicle deceleration values to calculate an average deceleration value defined by the formula:

$$Dec_{AVG} = \sum_{n=1}^{N} ((V_{n+1} - V_n)/(T_{n+1} - T_n))/N.$$

$V_n$ and $V_{n+1}$ are consecutively-received vehicle speed data. $V_{n+1}$ is received subsequent to $V_n$. $T_{n+1}$ is the time of reception of $V_{n+1}$. $T_n$ is the time of reception of $V_n$. N is the number of sequential speed data over which the vehicle deceleration value $Dec_{AVG}$ is calculated.

In yet another aspect of the invention, the method includes calculating the difference between a first calculated vehicle deceleration value and a second calculated vehicle deceleration value. The second deceleration value is calculated based on later sequential speed data than the first deceleration value is based on. The method further includes varying the output signal to correspond with the second deceleration value after a first amount of time $K_1$ when the second deceleration value is greater than the first deceleration value by a first amount, and after a second amount $K_2$ when the second deceleration value is less than the first deceleration by a second amount $K_1$. $K_1$ is different than $K_2$; accordingly, the output signal varies to correspond with the second deceleration value at a different rate when vehicle deceleration is increasing than when vehicle deceleration is decreasing.

In yet another aspect of the invention, the method includes comparing each of the vehicle deceleration values with a minimum threshold value. The method further includes setting the output signal to zero when the vehicle deceleration is less than the minimum threshold value.

In yet another aspect of the invention, the method includes recognizing when a vehicle stability event has occurred. A vehicle stability event includes at least one of implementation of an anti-lock brake system, implementation of a traction control system, occurrence of an under steer event and occurrence of a rollover event. The method includes setting the output signal to a preset level when occurrence of a vehicle stability event is recognized.

The above features and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
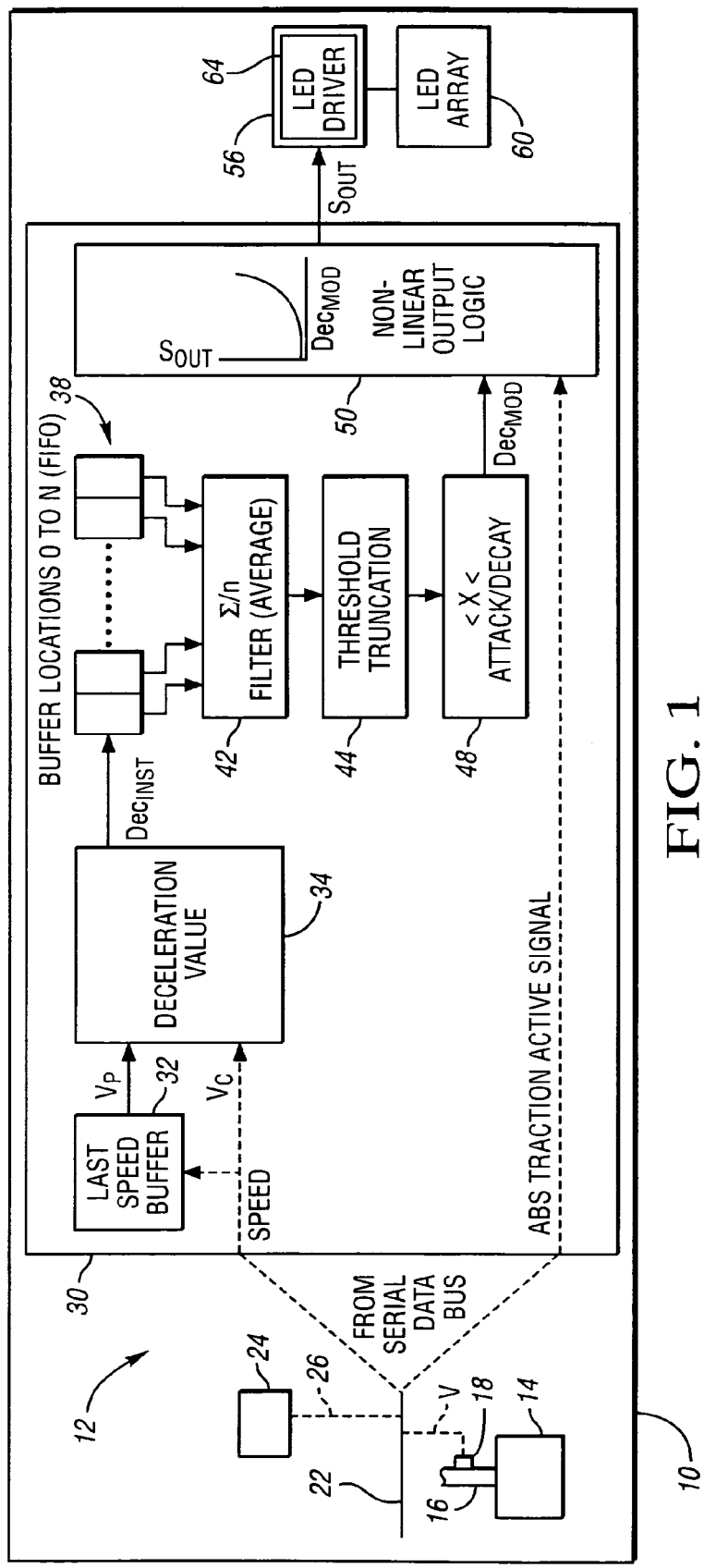
FIG. 1 is a schematic illustration of a vehicle deceleration display system.

Referring to the drawings, wherein like reference numbers refer to like components, a vehicle 10 having a vehicle deceleration display system 12 is shown in FIG. 1. The vehicle includes a transmission 14 having a transmission output shaft 16. A speed measuring device 18 is connected to the transmission output shaft 16. The speed measuring device 18 relays speed data (V) to a serial data bus 22. Preferably, the serial data bus 22 also relays other vehicle information. For instance, a vehicle stability information relaying device 24 relays vehicle stability data 26 to the serial data bus 22. The vehicle stability information relaying device may be an anti-lock brake system, a traction control system, or a sensor mounted to the vehicle which senses the occurrence of an under steer event or a rollover event. Accordingly, vehicle stability data may include implementation of the anti-lock brake system, implementation of the traction control system, the occurrence of an under steer event and/or the occurrence of a rollover event.

The serial data bus 22 is operatively connected to a control unit 30. The control unit 30 receives the vehicle speed data V as well as the vehicle stability data 26 from the serial data bus 22. The serial data, including the output shaft speed V and the vehicle stability data 26, may be transmitted on the bus 22 in either a periodic or non-periodic manner, depending on the particular bus protocol in use. In either case, the shaft speed V is transmitted via the bus 22 to the control unit 30 that controls the transmission; typically a power control module (PCM), an engine control module (ECM), or a separate transmission control module (TCM). The speed transmitted via the serial data bus 22, which may be referred to as a serial data message, is stored into a last speed buffer 32. The speed stored into the last speed buffer may be referred to as $V_p$, the previous speed. A subsequently received speed data message $V_c$ (i.e., a currently received speed) is then received by the control unit 30. $V_p$ and $V_c$ are consecutively received speed data. The control unit 30 calculates a deceleration value 34. The deceleration value 34 may be referred to as $Dec_{INST}$. $Dec_{INST}$ is defined by the following deceleration value function:

$$Dec_{INST}=(V_C-V_P)/T.$$

T is the elapsed time between reception of $V_c$ and $V_p$. The value of T may or may not be constant, depending upon whether the speed data are transmitted onto the serial data bus 22 in a periodic or non-periodic manner, respectively.

Because the vehicle transmission speed versus time may not form a particularly smooth curve, particularly in rough road environments, and because the formula of $Dec_{INST}$ is essentially a time-derivative, calculating deceleration in this manner will have the affect of exaggerating any unevenness in the curve. Therefore, some form of smoothing or filtering of the deceleration value is preferable. Accordingly, the control unit 30 includes a deceleration buffer 38. Deceleration buffer 38 includes a plurality of buffer locations zero (0) to N. The buffer 38 operates in a first in first out (FIFO) manner. Data stored in the buffer is processed by the control unit 30 to calculate a filtered or averaged deceleration value $Dec_{AVG}$ 42. $Dec_{AVG}$ is defined by the following deceleration value averaging (i.e., filtering) function:

$$Dec_{AVG} = \sum_{n=1}^{N}((V_{n+1} - V_n)/(T_{n+1} - T_n))/N.$$

$V_n$ and $V_{n+1}$ are consecutively-received vehicle speed data. $V_{n+1}$ is received subsequent to $V_n$ and is stored in a subsequent buffer location. $T_{n+1}$ is a time of reception of $V_{+n+1}$ and $T_n$ is the time of reception of $V_n$. N is the number of sequential speed data over which the vehicle deceleration value $Dec_{AVG}$ 42 is calculated. N corresponds with the number of buffer locations in the deceleration buffer 38. After the function 42 (as well as functions 44 and 48 discussed below) is performed by the control unit 30, the control unit 30 provides an output signal $S_{OUT}$ to illuminate a variable display 60 (which, in this embodiment is an LED array) via an indicator circuit 56 (which includes an LED driver 64). The output signal $S_{OUT}$ is preferably in the form of a level of voltage but may be presented by the control unit 30 in other forms within the scope of the invention.

In addition to the deceleration filtering function 42, the control unit 30 provides a threshold truncation or clipping function 44. The threshold truncation function 44 operates to limit varying of the display 60 to those deceleration conditions meriting such a display. Thus, changes in deceleration determined to be insignificant with respect to warning the trailing driver will not cause a variation in the display 60. The value of the low-end threshold will vary based on vehicle weight, aerodynamics, engine inertia, drive train loss and other physical vehicle phenomena. The low-end threshold should be calibrated on a per-vehicle basis.

In addition to the deceleration filtering function 42 and the threshold truncation function 44, an additional attack-decay clamp function 48 is implemented by the control unit 30. The attack-decay clamp function 48 operates to limit the ramp-up and decay rates of the illuminated LEDs (i.e., the rate of increase and rate of decrease, respectively, in the number of illuminated LEDs) to calibratable thresholds. For example, if a rough road condition causes the vehicle speed, as measured at the output shaft of the transmission 14, to drop and then suddenly increase, the attack-decay clamp function would prevent the number of illuminated LEDs from dropping quickly, forcing them instead to switch off at a slower rate. Specifically, the control unit 30 compares a first calculated vehicle deceleration value with a second calculated vehicle deceleration value that is calculated based on later sequential speed data than the first deceleration value. For instance, if the attack-decay clamp function 48 receives deceleration values that have been calculated subject to the deceleration filtering function 42, the second calculated vehicle deceleration value is based on filtered values received from the buffers 38 after a first deceleration value received from earlier information in the deceleration buffers 38. The attack-decay function 48 operates by applying a different time constant affecting the variation of the output signal $S_{OUT}$ when the vehicle deceleration is increasing than when the vehicle deceleration is decreasing. Accordingly, the control unit 30 provides an output signal $S_{OUT}$ that varies in correspondence with the second deceleration value after a first amount of time $K_1$ when a second deceleration value is greater than the first deceleration value by a first amount $_0Dec_1$ (i.e., when the vehicle deceleration is increasing), and after a second amount of time $K_2$ when the second deceleration value is less than the first deceleration value by a second amount $_0Dec_2$ (i.e., when the vehicle deceleration is decreasing). $K_1$ is different than $K_2$. Accordingly, the output signal varies to correspond with the second deceleration value at a different rate when the vehicle deceleration is increasing than when the vehicle deceleration is decreasing. Thus, the ramp up rate (i.e., the rate of increasing illumination of LEDs when vehicle deceleration is increasing) and the decay rate (i.e., the rate of de-illumination or turning off of LEDs when the vehicle deceleration is decreasing) may be varied. Additionally, the logic may implement the ramp up and decay controls in $K_1$ and $K_2$ at different thresholds $\Delta Dec_1$ and $\Delta Dec_2$, providing further sophistication of output signal $S_{OUT}$ variance.

After passing through the deceleration filtering function 42, the threshold truncation function 44 and the attack-decay clamp function 48, a modified deceleration value ($Dec_{MOD}$) is passed to an output logic function 50 of the control unit 30. The output logic function 50 produces the hardware output signal, $S_{OUT}$. The output logic function 50 operates such that $S_{OUT}$ varies nonlinearly with the input $Dec_{MOD}$. The exact nonlinear relationship will vary on a vehicle to vehicle basis, dependent upon factors such as the size and location of the indicator LEDs, and the desired level of LED display determined to be most easily interpreted by trailing drivers. Preferably, the existing output logic already in use on the control unit 30 for various other applications throughout the vehicle is reused and adapted to the present invention. By re-using the existing output logic, separate, stand-alone implementation of output logic specifically for the deceleration display system 12 is not needed. The graph of $Dec_{MOD}$ versus $S_{OUT}$ shown on the output logic function 50 shows a nonlinear correlation. $S_{OUT}$ remains low at low values of $Dec_{MOD}$. This is a result of the threshold truncation function 44 discussed above. Notably, within the scope of the invention, any one or any two of the functions 42, 44 or 48 may be performed by the control unit 30 (in lieu of performing all three of the functions 42, 44 and 48, as described herein).

In addition to being correlated with transmission output shaft speed, as modified through the various functions described in the control unit 30, $S_{OUT}$ is also correlated with and responsive to the vehicle stability data 26 provided on the serial data bus 22 from the vehicle stability information relaying device 24. For instance, when an automatic braking system/traction control system activation signal (i.e., one of the possible vehicle stability data) is relayed to the control unit 30, the output logic function 50 operates to provide an output signal $S_{OUT}$ at a preset (i.e., latched) level upon detecting the ABS/traction activation control. Communicated vehicle speed V from the transmission 14 may appear erratic upon implementation of an anti-lock brake system, a traction control system, the occurrence of an under steer event or the occurrence of a rollover event. The occurrence of such events are easily detected with the present invention as, on many current vehicles, their occurrence is typically accompanied by the controlling ECU alerting all other ECUs on the serial data bus 22. Thus, these events are easily detected and communicated via the serial data bus 22, and no additional hardware is required in order to detect and communicate these events to the control unit 30. By latching the algorithm output $S_{OUT}$ to a preset level upon detection of any of these events, the variable display (to be discussed with respect to FIGS. 3 and 4) will illuminate at a constant level during one of these events rather than at a potentially erratically-changing level that would result if based upon transmission output shaft speed V.

The output signal $S_{OUT}$ is relayed to the indicator circuit 56 (including the LED driver 64) which is operatively connected to and illuminates a variable display 60. In this embodiment, the variable display 60 is an LED array.

Figure 2:
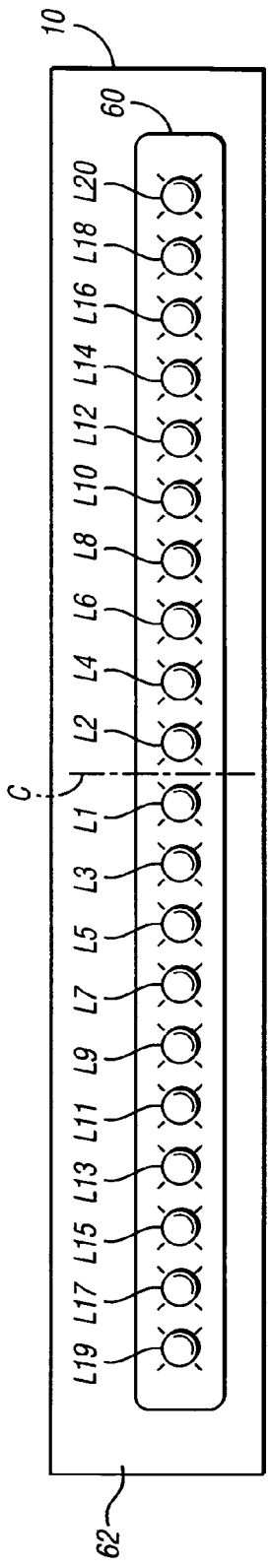
FIG. 2 is a plan view of an array of LEDs within the vehicle deceleration display system of FIG. 1.

Referring to FIG. 2, one embodiment of the variable display is an array 60 of LEDs numbered L1–L20 mounted on the rear 62 of the vehicle 10 and arranged in a horizontal manner. (Alternatively, within the scope of the invention, the array may arranged other than horizontally.) The LEDs illuminate in pairs sequentially outward from a center C of the array 60. For instance, L1 and L2 illuminate simultaneously, as a pair, as do L3 and L4, and so on. More illuminated LEDs indicates a greater deceleration. Accordingly, a "growing" brake light is visible to trailing drivers.

Many production vehicles include a center high-mounted stop lamp (CHMSL). CHMSLs are illuminated by application of a vehicle brake pedal. The array 60 may incorporate the CHMSL by dedicating the center-most LEDs to the existing CHMSL circuit. Accordingly, the existing CHMSL circuit could be altered to serve the purposes of the present invention, thus minimizing the cost of implementation and utilizing existing parts. Even if the center most LEDs are not actuated by the brake pedal, the existing CHMSL circuit may be used and altered to enable the array 60. In the embodiment shown in FIG. 2, the LEDs L1–L4 may be actuated by application of the brake pedal. By contrast, the LEDs L5–L20 are illuminated in proportion to $S_{OUT}$. The LEDs L5–L20 are illuminated in pairs; LED's L5 and L6 are illuminated first while LEDs L19 and L20 are illuminated last, with the number of LED pairs between L5 and L6 and L19 and L20 illuminated being in proportion to the magnitude of the output signal $S_{OUT}$.

Figure 3:
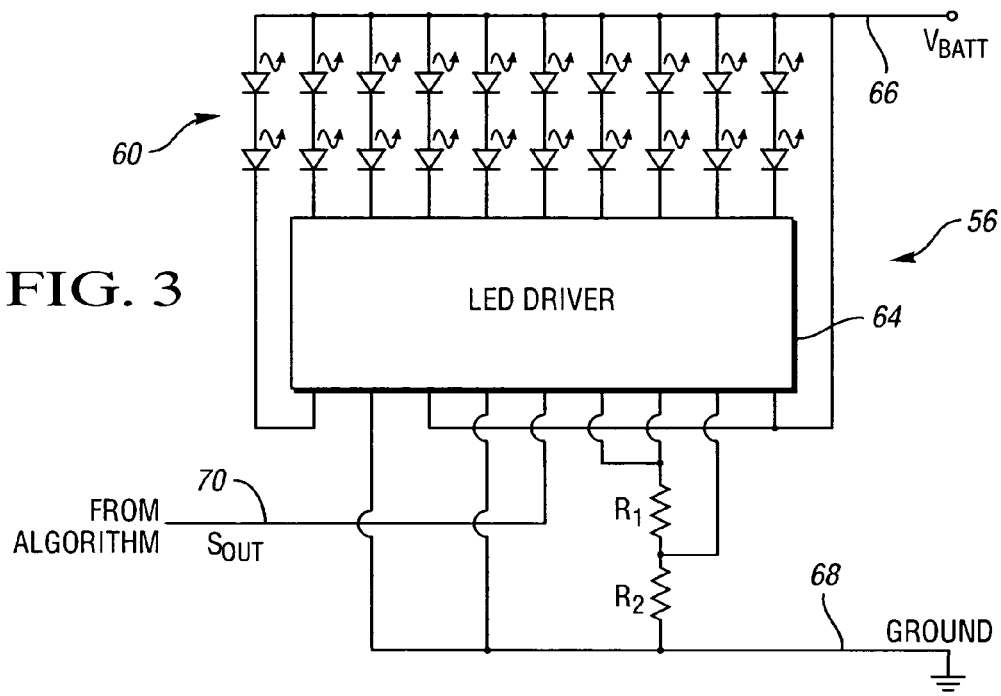
FIG. 3 is a schematic illustration of an indicator circuit used to drive the array of LEDs in the vehicle deceleration display system of FIG. 1.

Referring to FIG. 3, the indicator circuit 56 used in conjunction with the ECU 30 (and the logic functions performed therein) includes a simple LED driver 64. One model of an LED driver 64 that may be employed is National Semiconductor part number LM3914. The indicator circuit 56 requires three inputs; a high or supply rail 66, a ground 68 and a control line 70. The high rail 66 is connected to a battery on the vehicle (not shown) which typically has a voltage of 9.0 to 14.0 volts. If the vehicle has a CHMSL, the ground 68 may be the existing ground of the CHMSL. Accordingly, additional wiring would not be required to provide a ground to the circuit 56. The control line 70 is connected to the ECU 30 and carries the output $S_{OUT}$ of the ECU 30 (see FIG. 1), as discussed above. Only the single control line 70 must be routed to the ECU 30.

The indicator circuit 56 includes resistors R1 an R2 which control the amount of current through each of the LEDs ($i_{LED}$) in accordance with the range of input voltage ($V_{INP}$) (i.e., the range of values of $S_{OUT}$ provided by the control unit 30). R1 and R2 can be customized to the needs of the particular application using the following formulae:

$$i_{LED} = \frac{12.5}{R1}; \text{ and } V_{INP} = 1.25\left(1 + \frac{R2}{R1}\right).$$

(The above formulae assume a battery voltage of 12.5 volts.) For example, to deliver an LED current of 25 mA, in using a control voltage range of 0 to 5 volts (i.e., when $V_{INP}$ varies between 0 and 5 volts) the values of R1 and R2 should be 500 ohms and 1,500 ohms, respectively. This allows control of the exact amount of current through each pair of LEDs, as well as the input range for the indicator circuit 56. Accordingly, use of the resistors R1 and R2 insures that a variety of output logic 50 (see FIG. 1) in the ECU 30 (i.e., logic having a range of 0–3 volts, 0–5 volt, 0–12 volt, etc.) may be used to provide a desired $i_{LED}$ and $V_{INP}$ for maximum cost effectiveness. Thus, output logic systems already in use on typical modern vehicles may be adapted to provide the desired $i_{LED}$ and $V_{INP}$ by use of the correct combination of resistors R1 and R2. Note that the LED array 60 of FIG. 3 is shown schematically; it may be arranged in a horizontal manner as shown in FIG. 2.

Figure 4:
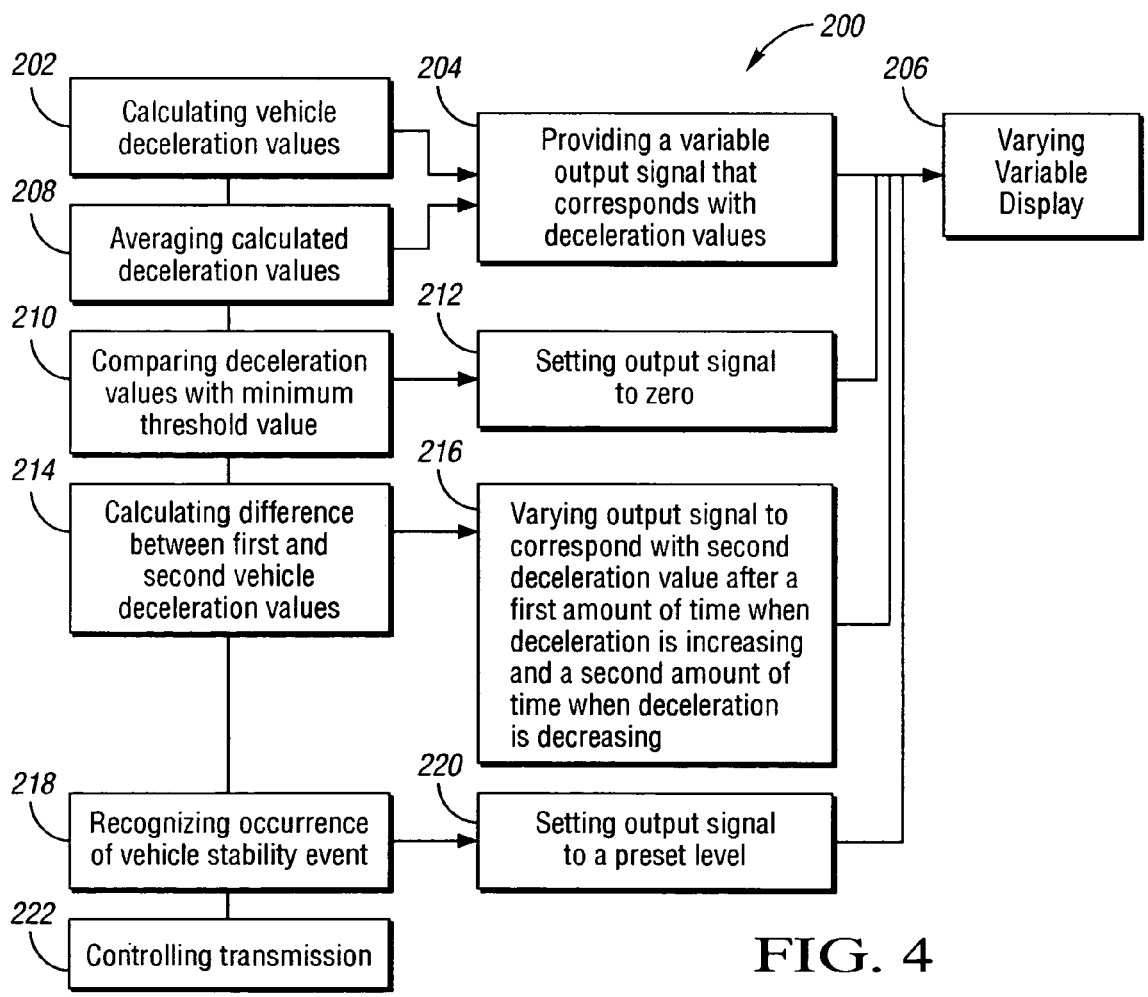
FIG. 4 is a flow diagram illustrating a vehicle deceleration calculation method.

Referring to FIG. 4, a vehicle deceleration calculation and display method 200 is illustrated. The method 200 includes calculating vehicle deceleration values 202 from sequentially-measured vehicle speed data received via a serial data bus. Preferably, the vehicle speed data are measured from an output shaft of a transmission. Calculating vehicle deceleration values 202 may include subtracting a received vehicle speed datum ($V_p$) from a consecutive, subsequently-received vehicle speed datum ($V_c$) and dividing the result ($V_c - V_p$) by the elapsed time between receipt of the respective data. The method 200 further includes providing a variable output signal 204 that corresponds with the calculated deceleration values. The output signal may vary increasingly nonlinearly with increasing vehicle deceleration values. The method 200 further includes varying a variable display 206 in response to the output signal. The variable display may include a plurality of light-emitting diodes (LEDs) arranged in a horizontal array and mounted on the rear of a vehicle. Varying the variable display 206 may include illuminating LEDs in sequential pairs outward from a center of the array, the number of sequential pairs illuminated being in increasing nonlinear proportion to the magnitude of the output signal.

Consistent with the deceleration filtering function 42 discussed with respect to FIG. 1, the method 200 may include averaging a number of sequentially calculated vehicle deceleration values 208 to calculate and average deceleration value:

$$Dec_{AVG} = \sum_{n=1}^{N} ((V_{n+1} - V_n)/(T_{n+1} - T_n))/N.$$

$V_n$ and $V_{n+1}$ are consecutively-received vehicle speed data. $V_{n+1}$ is received subsequently to $V_n$. $T_{n+1}$ is the time of reception of $V_{n+1}$. $T_n$ is the time of reception of $V_n$. N is the number of sequential speed data over which the vehicle deceleration value $Dec_{AVG}$ is calculated.

Consistent with the threshold truncation function 44 discussed with respect to FIG. 1, the method 200 may include comparing each deceleration value with a minimum threshold value 210. The method 200 may further include setting the output signal to zero 212 when the vehicle deceleration value is less than the minimum threshold value.

Consistent with the attack-decay clamp function 48 discussed with respect to FIG. 1, the method 200 may include calculating the difference between first and second vehicle deceleration values 214. The second deceleration value is calculated based on later sequential speed data than the first deceleration value. The method 200 may further include varying the output signal 216 to correspond with the second deceleration value after a first amount of time $K_1$ when the second deceleration value is greater than the first deceleration value by a first amount, and after a second amount of time when the second deceleration value is less than the first deceleration value by a second amount K2. K1 is different than K2. Thus, the output signal varies to correspond with the second deceleration value at a different rate when the vehicle deceleration is increasing than when the vehicle deceleration is decreasing.

The method 200 may further include recognizing the occurrence of a vehicle's stability event 218. A potential vehicle stability event includes those discussed with respect to FIG. 1. The method 200 may further include setting the output signal to a preset level when the occurrence of a vehicle stability event is recognized 220.

The method 200 may further include controlling the transmission 222 via the control unit using the sequential speed data. Thus, the same control unit used to control the transmission may be utilized to calculate an output signal to vary the variable display.

While the best modes for carrying out the invention have been described in detail, those familiar with the art to which this invention relates will recognize various alternative designs and embodiments for practicing the invention within the scope of the appended claims.

The invention claimed is:

1. A vehicle deceleration display system comprising:
a serial data bus operable for communicating a plurality of sequentially measured vehicle speed datums in a respective sequential manner;
a control unit operatively connected to said serial data bus and operable for receiving and processing said vehicle speed data therefrom, wherein said control unit is programmed to sequentially calculate vehicle deceleration values respectively corresponding with said sequential vehicle speed data to provide a variable output signal which corresponds with and varies in accordance with said sequential vehicle deceleration values; and
a variable display operatively connected to said control unit, wherein said variable display varies in response to said output signal.

2. The vehicle deceleration display system of claim 1, wherein each datum is a measurement of the speed of an output shaft of a transmission on the vehicle; and
wherein said control unit is further programmed for controlling said transmission using said sequential vehicle speed data.

3. The vehicle deceleration display system of claim 1, wherein each of said vehicle deceleration values ($Dec_{INST}$) is defined by the equation:
$Dec_{INST} = (V_c - V_p)/T$, wherein $V_c$ and $V_p$ are consecutively-received vehicle speed data, wherein $V_c$ is received subsequent to $V_p$, and T is the elapsed time between reception of said respective data.

4. The vehicle deceleration display system of claim 1, wherein each of said vehicle deceleration values represents an average of a number of sequentially calculated deceleration values:

$$Dec_{AVG} = \sum_{n=1}^{N} ((V_{n+1} - V_n)/(T_{n+1} - T_n))/N;$$

wherein $V_n$ and $V_{n+1}$ are consecutively-received vehicle speed data, $V_{n+1}$ being received subsequent to $V_n$, $T_{n+1}$ is the time of reception of $V_{n+1}$, $T_n$ is the time of reception of $V_n$, and N is the number of sequential speed data over which said vehicle deceleration value $Dec_{AVG}$ is calculated.

5. The vehicle deceleration system of claim 1, wherein said control unit is programmed to calculate the difference between a first calculated vehicle deceleration value and a second calculated vehicle deceleration value, said second deceleration value being calculated based on later sequential speed data than said first deceleration value;
wherein said control unit provides said output signal varying in correspondence with said second deceleration value after a first amount of time $K_1$, when said second deceleration value is greater than said first deceleration value by a first amount and after a second amount of time $K_2$ when said second deceleration value is less than said first deceleration value by a second amount; and
wherein $K_1$ is different than $K_2$, such that said output signal varies to correspond with said second deceleration value at a different rate when vehicle deceleration is increasing than when vehicle deceleration is decreasing.

6. The vehicle deceleration system of claim 1, wherein said control unit is further programmed to compare said vehicle deceleration value with a minimum threshold value, and wherein said control unit does not provide said output signal when said vehicle deceleration value is less than said minimum threshold value, such that said variable display does not vary in response to deceleration values less than the minimum threshold value.

7. The vehicle deceleration system of claim 1, wherein said serial data bus is further operable for communicating vehicle stability data to said control unit including at least one of implementation of anti-lock brake system, implementation of a traction control system, occurrence of an understeer event and occurrence of a rollover event; and
wherein said control unit provides said output signal at a preset level when said vehicle stability data is so communicated.

8. The vehicle deceleration system of claim 1, wherein said variable display comprises a plurality of light-emitting diodes (LEDs) arranged in an array and mounted on the rear of the vehicle, wherein said LEDs are illuminated in sequential pairs outward from a center of said array, the number of sequential pairs illuminated being in increasing nonlinear proportion to the magnitude of said output signal.

9. The vehicle deceleration system of claim 8, wherein at least some of said LEDs are illuminated in response to application of a vehicle brake pedal, said LEDs illuminated in response to application of the brake pedal being generally centrally-located in the array.

10. A method comprising:
- calculating vehicle deceleration values from sequentially-measured vehicle speed data received via a serial data bus; and
- providing an output signal that varies in accordance with said calculated vehicle deceleration values.

11. The method of claim 10, further comprising:
- varying a variable display in response to said output signal.

12. The method of claim 11, wherein said variable display comprises a plurality of light-emitting diodes (LEDs) arranged in an array and mounted on the rear of the vehicle; and
- wherein said varying said variable display includes illuminating said LEDs in sequential pairs outward from a center of said array, the number of sequential pairs illuminated being in increasing nonlinear proportion to the magnitude of said output signal.

13. The method of claim 10, wherein said vehicle speed data comprises a plurality of sequentially-measured speeds of an output shaft of a transmission wherein a control unit operatively connected to said serial data bus receives said speed data and calculates said vehicle deceleration values; and further comprising:
- controlling said transmission via said control unit using said sequential vehicle speed data.

14. The method of claim 10, wherein said output signal varies increasingly nonlinearly with increasing vehicle deceleration values.

15. The method of claim 10, wherein said calculating includes subtracting a received vehicle speed datum ($V_p$) from a consecutive, subsequently-received vehicle speed datum ($V_c$) and dividing the result ($V_c-V_p$) by the elapsed time between receipt of said respective data.

16. The method of claim 10, further comprising:
- averaging a number of sequentially-calculated vehicle deceleration values to calculate an average deceleration value:

$$Dec_{AVG} = \sum_{n=1}^{N}((V_{n+1} - V_n)/(T_{n+1} - T_n))/N;$$

wherein $V_n$ and $V_{n+1}$ are consecutively-received vehicle speed data, $V_{n+1}$ being received subsequent to $V_n$, $T_{n+1}$ is the time of reception of $V_{n+1}$, $T_n$ is the time of reception of $V_n$, and N is the number of sequential speed data over which said vehicle deceleration value $Dec_{AVG}$ is calculated.

17. The method of claim 10, further comprising:
- calculating the difference between a first calculated vehicle deceleration value and a second calculated deceleration value, said second deceleration value being calculated based on later seqaential speed data than said first deceleration value; and
- varying said output signal to correspond with said second deceleration value after a first amount of time $K_1$ when said second deceleration value is greater than said first deceleration value by a first amount, and after a second amount of time $K_2$ when said second deceleration value is less than said first deceleration by a second amount, wherein $K_1$ is different than $K_2$, such that said output signal varies to correspond with said second deceleration value at a different rate when vehicle deceleration is increasing than when vehicle deceleration is decreasing.

18. The method of claim 10, further comprising:
- comparing each of said vehicle deceleration values with a minimum threshold value; and
- setting said output signal to zero when said vehicle deceleration value is less than said minimum threshold value.

19. The method of claim 10, further comprising:
- recognizing when a vehicle stability event has occurred, said vehicle stability event including at least one of implementation of an anti-lock brake system, implementation of a traction control system, occurrence of an understeer event and occurrence of a rollover event; and
- setting said output signal to a preset level when occurrence of a vehicle stability event is recognized.

20. A method comprising:
- calculating vehicle deceleration values from sequentially-measured vehicle speed data received via a serial data bus, said vehicle speed data including a plurality of sequentially-measured speeds of an output shaft of a transmission;
- providing an output signal that varies in accordance with said calculated vehicle deceleration values;
- averaging a number of sequentially-calculated vehicle deceleration values to calculate an average deceleration value defined by the formula:

$$Dec_{AVG} = \sum_{n=1}^{N}((V_{n+1} - V_n)/(T_{n+1} - T_n))/N;$$

wherein $V_n$ and $V_{n+1}$ are consecutively-received vehicle speed data, $V_{n+1}$ being received subsequent to $V_n$, $T_{n+1}$ is the time of reception of $V_{n+1}$, $T_n$ is the time of reception of $V_n$, and N is the number of sequential speed data over which said vehicle deceleration value $Dec_{AVG}$ is calculated;

- calculating the difference between a first calculated vehicle deceleration value and a second deceleration value, said second deceleration value being calculated based on later sequential speed data than said first deceleration value;
- varying said output signal to correspond with said second deceleration value after a first amount of time $K_1$ when said second deceleration value is greater than said first deceleration value by a first amount and after a second amount of time $K_2$ when said second deceleration value is less than said first deceleration by a second amount, wherein $K_1$ is different than $K_2$, such that said output signal varies to correspond with said second deceleration value at a
- different rate when vehicle deceleration is increasing than when vehicle deceleration is decreasing;
- comparing each of said vehicle deceleration values with a minimum threshold value;
- setting said output signal to zero when said vehicle deceleration value is less than said minimum threshold value;
- recognizing when a vehicle stability event has occurred, said vehicle stability event including at least one of implementation of an anti-lock brake system, implementation of traction control system, occurrence of an understeer event and occurrence of a rollover event; and
- setting said output signal to a preset level when occurrence of a vehicle stability event is recognized.

* * * * *